United States Patent Office 3,267,686
Patented August 23, 1966

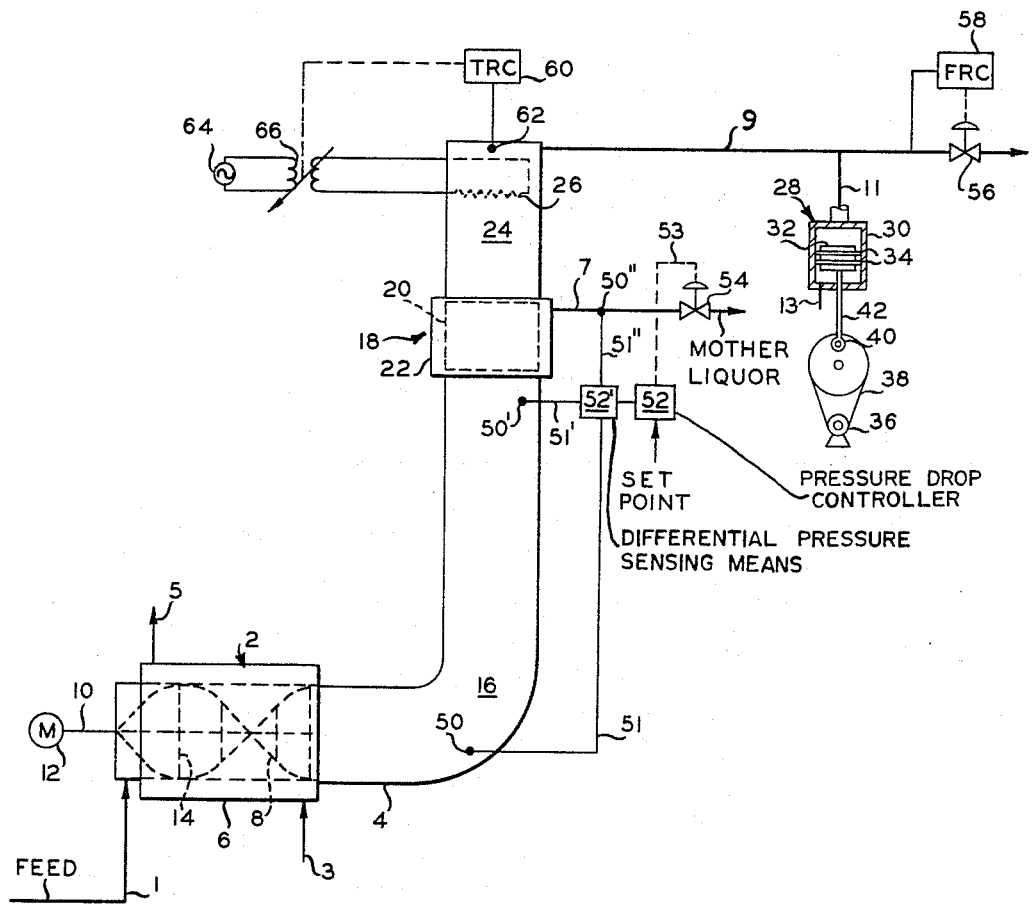

3,267,686
FRACTIONAL CRYSTALLIZATION HAVING A LIQUOR WITHDRAWAL RESPONSIVE TO A PRESSURE DIFFERENTIAL
Chester C. Holley, Bartlesville, Okla., assignor to Phillips Petroleum Company, a corporation of Delaware
Filed Sept. 16, 1963, Ser. No. 309,182
11 Claims. (Cl. 62—58)

This invention relates to the separation of mixtures by crystallization. In one aspect this invention relates to a control system for crystal purification apparatus. In another aspect this invention relates to a method for controlling the operation of crystal purification processes and apparatus.

Purification by means of fractional crystallization has been known for a number of years. Schmidt, Re. 23,810 (1954), discloses a process and apparatus for purifying crystals, which process involves moving a mixture of crystals and adhering liquid through a liquid removal zone, a reflux zone and a melting zone, removing liquid in said liquid removal zone, melting crystals in said melting zone, withdrawing part of the melt as product and forcing another part of the melt in a direction countercurrent to the movement of crystals in said reflux zone. Thomas, U.S. 2,854,494 (1958) discloses a process and apparatus for effecting separation by fractional crystallization at high throughput rates, improved stability and ease of operation, improved heat distribution, and production of high purity products over long periods of operation. In this patent, solids are countercurrently contacted with a reflux liquid in a purification zone, the solids in said zone being contacted with an intermittent flow of reflux liquid simultaneously with a propulsion of the solids through said zone. The countercurrent intermittent flow of reflux liquid with the solids is obtained by applying a pulsating pressure to the melt in the purification column. These processes are generally applicable to the separation of at least one pure component from any mixture which is resolvable into its components by fractional crystallization. For example, the processes can be used for the concentration of fruit juices, vegetable juices, beer, wine, and other materials which comprise aqueous solutions which can be concentrated by the formation and removal of ice crystals. The processes are also of great value in the resolution of non-aqueous mixtures, an example of such an application being the separation of para-xylene from a mixture thereof with the other xylene isomers and ethylbenzene.

In the operation of pulse crystal purification columns, a slurry of crystals and mother liquor is passed from a chiller into the prefilter section of the column and then through a filter zone, wherein a portion of the mother liquor is removed through the filter leaving a crystal bed containing 60 to 75 percent solids. It is highly desirable that the solids content of the crystal bed be held constant because (1) transport of the bed through the reflux zone to the melt zone is made easier and (2) channelling of the bed with reflux liquid is reduced, thereby keeping purity of the melt product at high levels.

Prior practice has been to hold a constant back pressure on the mother liquor flow from the column as a means of restricting mother liquor flow and thereby controlling the solids content of the crystal bed. However, as pressure at the inlet to the column varies, the flow of mother liquor varies and subsequently the solids content of the crystal bed fluctuates. Such variations cause channelling of the crystal bed at times, and when the solids content becomes too high the crystal bed fails to move properly.

I have discovered an improved control system for use in combination with crystal purification apparatus which overcomes the disadvantages of the prior art.

Accordingly, it is an object of my invention to provide an improved method for controlling the operation of crystal purification processes and apparatus. Another object of my invention is to provide a control system for use in combination with crystal purification apparatus. Still another object of my invention is to provide a method for controlling the rate of mother liquor withdrawal from crystal purification apparatus. A further object of my invention is to provide a method for controlling the purity of the products produced and recovered from crystal purification processes and apparatus.

Other objects, aspects and advantages of my invention will be apparent to those skilled in the art from a study of this disclosure, the accompanying drawing, and appended claims.

Broadly, my invention resides in an improved control of crystal purification processes and apparatus. In accordance with my improved control system, the flow of mother liquor is regulated in response to the pressure drop across the crystal purification apparatus. Further in accordance with my invention, the controlling pressure drop is measured across the prefilter section, across the filter section, or across both prefilter and filter sections of the purification column.

My invention is applicable to the resolution of a vast number of simple binary and complex multi-component mixture systems by fractional crystallization processes and apparatus. Particularly, such systems are hydrocarbons which have practically the same boiling points and are very difficult to separate by distillation. Where the hydrocarbons are high-boiling organic compounds, separation by crystallization is required because of such compounds being unstable at distillation temperatures. Examples of non-aqueous mixtures include combinations of benzene, normal heptane, carbon tetrachloride, ethyl alcohol, cyclohexane, methylcyclohexane, toluene, chloroform, acetone, para-xylene, other xylene isomers, ethylbenzene, and the like. My invention is also applicable to the fractional crystallization separation wherein it is desirable to recover mother liquor from the crystals as a product of the process. This situation arises where it is desired to increase the concentration of the dilute solution. For example, the invention is applicable to the production of concentrated food products which involves primarily the removal of water from these products, such as removing water from fruit juices such as grape, orange, lemon, pineapple, apple, tomato, and the like, and in the concentration of vegetable juices and other beverages such as milk, beer, wine, coffee, tea, and the like.

My invention will now be more fully described in reference to the accompanying drawing, which illustrates a cross-sectional diagrammatic representation of a fractional crystallization system and which includes the control system of my invention.

Referring now to the drawing in detail, a feed mixture comprising two or more components, one of which is separable from the mixture by crystallization, is passed through conduit 1 into freezing zone 2. Freezing zone 2 comprises housing 4 surrounded by cooling jacket 6 having inlet 3 and outlet 5 for passage of cooling medium therethrough. Agitating or scraping means 8 are positioned within housing 4 and are designed to prevent the accumulation of solid material on the inner surface of housing 4. Scraping means 8 can be constructed of strips of metal or other suitable material and can be fabricated in the form of a helix, as shown in the drawing, or can be straight. Any form of scraping means 8 can be provided. Scraping means 8 are mounted on a rotatable shaft 10 by spoke members 14. Shaft 10 is axially positioned within housing 4 and is driven by motor 12. Sufficient cooling medium is circulated through jacket 6 to freeze a predetermined amount of solid crystals from the feed passing therethrough.

The resulting slurry of crystals in mother liquor produced in freezing zone 2 is passed therefrom directly into prefilter zone 16 and then into filter zone 18. Prefilter zone 16 comprises an extension of housing 4 of freezing zone 2. Filter zone 18 comprises a suitable filter screen or medium 20 and an external shell 22, the latter being provided with an outlet conduit 7 for removal of the filtrate. Filter medium 20 can be of various types. Examples of such a medium are metallic screens, centered perforate metal members, perforate members supporting filter cloths, and the like.

After removal of the mother liquor, the remaining crystal mass passes to reflux zone 24 which comprises an additional extension of housing 4. In reflux zone 24 the crystal mass is countercurrently contacted with liquid reflux. The opposite end of the reflux zone 24 from filter 18 is a melt section having a heating element 26 therein. Heating element 26 can be in the form of an electrical heater (as shown) or a heat transfer coil through which a suitably heated fluid is pumped. Electrical power is transmitted to electrical heating element 26 from power source 64 by means of a suitable variable power transferring device, such as a Servo motor rotated powerstat 66. As the crystal mass approaches heating element 26 in the top of reflux zone 24, the crystals are melted. Part of the melt produced by heater element 26 is withdrawn through conduit 9 as a high-purity product of the process. The remainder of the melt is forced back into reflux zone 24 to form reflux which effects crystal purification. The resulting liquid from the reflux zone is drawn off through conduit 7, together with the mother liquor filtrate.

Pulsation-producing means 28 communicates with the purification column through conduits 11 and 9 to force the reflux countercurrent to the crystal flow in reflux zone 24. Pulsation-producing means 28 comprises a cylinder 30 with a reciprocable piston 32 therein. Piston 32 is suitably sealed in cylinder 30, for example by means of rings 34, to prevent the leakage of melt from the purification zone. The reciprocation of piston 32 is produced, for example by electric motor 36, a belt 38, a crank means 40 and connecting rod 42, which is sealed in housing 30 by means of a packing gland. An outlet 13 is provided in housing 30 to facilitate reciprocation of piston 32 and can be connected to means, not shown, for recovery of any material which might escape from the purification column in case of failure of rings 34. The reciprocation of piston 32 can be at any suitable rate, such rate being dependent upon the separation being made in the column and the solids content maintained therein. Generally, pulsations will be produced from the reciprocation of piston 32 in the range of about 100 to about 500 pulsations per minute.

Pressure measuring means and transmitters 50, 50' and 50" are positioned in prefilter zone 16 and filtrate outlet conduit 7. Measurements taken at one time by any two of the means 50, 50' and 50" are passed to a differential pressure cell 52' by lines 51, 51' and 51". Valves, not shown, in line 51, 51' and 51" are manipulated to pass two of the measurements from means 50, 50' and 50" while the other is blocked out. Differential pressure cell 52' compares the two measurements passing thereto and produces a signal representative of the difference therebetween. This pressure differential signal passes to controller 52 where it is compared with a desired differential pressure signal, known as a set point signal, to produce a control signal. The control signal is transmitted to valve 54 in conduit 7 through control line 53. The control signal manipulates valve 54 to regulate the quantity of mother liquor withdrawn through conduit 7 in response to the pressure drop across the filter zone, across the prefilter zone or across both zones of the purification column. The solids content of the crystal bed is thus controlled and held constant. Desired pressure drop across the prefilter plus filter sections will vary depending upon the size and nature of the crystals being purified, i.e., a small pressure drop will be maintained with large, porous crystals and a large pressure drop with small, mushy crystals. The pressure drop may thus vary from 1 to 100 p.s.i. The mother liquor outlet pressure will depend upon the total pressure under which the entire system operates and will generally be in the range of 75–150 p.s.i.g. As the measurement of pressure drop increases, valve 54 closes to reduce the withdrawal of mother liquor. Valve 56 in conduit 9 is manipulated by flow recorder 58 operatively connected to conduit 9 upstream of valve 56 to regulate the flow of product withdrawn. Temperature-recorder-controller 60, receiving a signal from thermocouple 62 positioned in the melt section of reflux zone 24, passes a control signal to regulate the position of powerstat 66 controlling the quantity of energy passed to heating element 26 and in turn the amount of heat added to the melt section of reflux zone 24.

While the invention has been illustrated utilizing an indirect heat exchange freezing zone, it is within the contemplation of the invention to utilize direct heat exchange between a suitable refrigerant, such as propane, and the feed. Also, an external heater can be employed in place of the internal heating element 26 within the melt section of reflux zone 24 of the purification column.

The pressure drop controller 52 and differential pressure cell 52', can be any devices operating on electrical, pneumatic, hydraulic, or mechanical means to effect control signals. A suitable pneumatic differential cell 52' is the Foxboro d/p cell described on page 23 of bulletin 450 of Foxboro Company, Foxboro, Mass. A suitable pressure drop controller 52 is the Foxboro controller model 40, described on page 52 of the same bulletin.

As a general rule, the solids content of the mixture of feed from the freezing zone into the purification column is within the range of about 20 to about 60 weight percent, and preferably in the range of about 30 to about 50 weight percent. However, solids concentrations outside the stated ranges can be used.

The following example is presented to further illustrate the invention, although it is not intended that the invention should be limited thereto.

*Example*

The fractional crystallization system utilized in this example was of the type illustrated in FIGURE 1. The purification column was constructed of flanged steel pipe 6 inches in diameter. The prefilter zone was 90 inches in length, the filter zone was 12 inches in length, and the reflux zone was 24 inches in length. The filter had an area of 200 square inches and contained a filtration medium of 20 x 110 mesh Dutch Weave screen. The heater, an electrical resistance type, had a 1-square-foot stainless steel element. The pulse unit had a 6-cubic-inch displacement and operated at 360 cycles per minute. Connected to one end of the column was a 6-inch diameter scraped surface chiller, 20 feet in length and connected to the column by means of flanges at an angle of 90° with the vertical. The chiller was provided with a jacket through which coolant was circulated. The coolant was ammonia at a temperature of 15° F. Within the chiller was a scraper of the type illustrated in FIGURE 1. A 14.5 weight percent sucrose solution in water was introduced to the chiller as feed. Feed to the prefilter zone of the column contained 45 weight percent solids. The column temperatures in degrees Fahrenheit were: inlet 27.6, mother liquor outlet 30.0, and product outlet 88.0. The pressures of the column, in p.s.i., were: chiller inlet 113, purification zone inlet 118, filter inlet 98, product outlet 95, and a prefilter pressure drop of 20 p.s.i.

In a first run using conventional mother liquor back-pressure control, the composition of the product was 0.8–1.8 percent sucrose and the mother liquor contained 24.1–23.3 weight percent sucrose. The flows in gallons per hour were: feed 54, product 23, and mother liquor filtrate 31.

In a second run using the pressure drop across the prefilter section 16, pressure measuring means 50 and 50′ in accordance with my invention to control the withdrawal of mother liquor, the composition of the product was 0 percent sucrose and the mother liquor contained 24.8 weight percent sucrose. The flows in gallons per hour were: feed 54, product 26, and mother liquor 12–36.

From the foregoing example it is readily apparent that I have provided an improvement for controlling a crystal purification process and apparatus wherein better operation of the apparatus is obtained and greater purity product is produced.

It will be understood that various combinations of flow rates, temperatures, and pressures can be employed in the fractional crystallization system dependent upon the separation to be made and the purity of the product desired.

Variations and modifications within the scope of the disclosure and the appended claims can readily be effected by those skilled in the art without departing from the spirit and scope of this invention.

I claim:

1. In a process wherein a body of solids is moved through a stationary prefilter zone, a filter zone, wherein liquid is removed, a reflux zone and a solids melting zone; solids are melted in said melting zone, part of the melt being removed from the system and another part being forced in the direction countercurrent to the direction of movement of solids; and the materials in said zones are subjected to an intermittent back-pressure simultaneously with the described movement of said solids; the improvement which comprises maintaining a predetermined solids content of said body of solids by measuring the differential pressure across a portion of said solids and regulating the withdrawal of liquid from said filter zone in response to said pressure differential.

2. The process of claim 1 wherein said differential pressure is measured across said prefilter zone.

3. The process of claim 1 wherein said differential pressure is measured across said filter zone.

4. The process of claim 1 wherein said differential pressure is measured across said prefilter and filter zone.

5. In a process for separating a component from a liquid multi-component mixture which comprises introducing said mixture into a freezing zone; freezing said mixture in said freezing zone so as to crystallize at least a portion of one of the component of said mixture; passing the resulting slurry of crystals and mother liquor through a prefilter zone into a filtering zone; withdrawing mother liquor from said filtering zone; passing the resulting crystal mass from said filtering zone through a reflux zone into a melting zone; melting crystals in said melting zone; and withdrawing melt from said melting zone as a product of the process; the improvement which comprises measuring differential pressure across a portion of said crystals and regulating the withdrawal of said mother liquor from said filter zone in response to said pressure differential measurement to maintain a predetermined solids content of said crystals.

6. The process according to claim 5 in which said multi-component mixture comprises beer.

7. The process according to claim 5 in which said multi-component mixture comprises fruit juices.

8. The process according to claim 5 in which said mixture contains sucrose and water.

9. The process of claim 8 in which said differential pressure is maintained within the range of from 1 to 100 p.s.i.

10. A process which comprises chilling a liquid multi-component mixture to obtain a solids content in the range of 20 to 60 weight percent, said solids comprising essentially ice crystals; passing the resulting mixture through a prefilter zone into a filtering zone; removing liquid from said filtering zone as a product of the process; passing the remaining solids through a reflux zone and into a melting zone; melting solids in said melting zone; removing part of the molten material from said melting zone; subjecting the molten material in said melting zone to a pulsating back-pressure; measuring the drop in pressure across a portion of said solids; and regulating the withdrawal of liquid from said filtering zone in response to said pressure differential measurement.

11. The process of claim 10 wherein said pulsating back-pressure comprises pulsations from 100 to 500 per second.

References Cited by the Examiner

UNITED STATES PATENTS

| | | | |
|---|---|---|---|
| 2,940,272 | 6/1960 | Croley | 62—58 X |
| 3,093,649 | 6/1963 | Ratje et al. | 62—58 |
| 3,142,969 | 9/1964 | Stollen | 62—58 |
| 3,212,282 | 10/1965 | Stollen | 62—58 X |
| 3,212,283 | 10/1965 | Jackson et al. | 62—58 |

NORMAN YUDKOFF, *Primary Examiner.*

G. P. HINES, *Assistant Examiner.*